(12) United States Patent
Jiang et al.

(10) Patent No.: US 8,578,594 B2
(45) Date of Patent: Nov. 12, 2013

(54) PROCESS FOR FABRICATING A MAGNETIC POLE AND SHIELDS

(75) Inventors: Ming Jiang, San Jose, CA (US);
Ronghui Zhou, Fremont, CA (US);
Guanghong Luo, Fremont, CA (US);
Masahiro Osugi, Fremont, CA (US);
Danning Yang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/154,191

(22) Filed: Jun. 6, 2011

(65) Prior Publication Data

US 2012/0304454 A1 Dec. 6, 2012

(51) Int. Cl.
*G11B 5/127* (2006.01)
*H04R 31/00* (2006.01)

(52) U.S. Cl.
USPC .......... 29/603.16; 29/603.13; 29/603.14; 29/603.15; 29/603.18; 216/22; 216/39; 216/41; 216/48; 216/65; 360/125.02; 360/125.03; 360/125.13; 360/125.3; 360/125.33

(58) Field of Classification Search
USPC ......... 29/603.11–603.16, 603.18; 216/22, 39, 216/41, 48, 65; 360/125.02, 125.03, 360/125.13, 125.3, 125.33; 451/5, 41
See application file for complete search history.

(56) References Cited

U.S. PATENT DOCUMENTS

| | | | |
|---|---|---|---|
| 4,460,434 A | 7/1984 | Johnson et al. | |
| 4,662,985 A | 5/1987 | Yoshida et al. | |
| 5,091,048 A | 2/1992 | Thomas | |
| 5,744,400 A | 4/1998 | Dyer | |
| 5,953,578 A | 9/1999 | Lee | |
| 6,288,357 B1 | 9/2001 | Dyer | |
| 7,296,339 B1 * | 11/2007 | Yang et al. | 29/603.16 |
| 8,166,631 B1 * | 5/2012 | Tran et al. | 29/603.14 |
| 8,196,285 B1 * | 6/2012 | Zhang et al. | 29/603.13 |
| 8,225,488 B1 * | 7/2012 | Zhang et al. | 29/603.16 |
| 2003/0127424 A1 | 7/2003 | Clinton et al. | |
| 2005/0057852 A1 * | 3/2005 | Yazawa et al. | 360/125 |
| 2006/0198049 A1 * | 9/2006 | Sasaki et al. | 360/126 |
| 2007/0037100 A1 | 2/2007 | Falterrneier et al. | |

FOREIGN PATENT DOCUMENTS

JP 61-289635 A 12/1986

OTHER PUBLICATIONS

"Ion Mill Trimming/Etch Systems", Advanced Modular Systems, Inc., downloaded on Feb. 22, 2011 from http://dotnetgear.com/pub/products/ion-mill-trimmingetch-systems, 2 pages.
Zeuner et al., "IonScan 800—Ultra-precise film thickness trimming for Semiconductor Technology", Roth & Rau AG, Application Note Jan. 2007, 7 pages.
Roth & Rau MicroSystems, Department of Plasma and Ion Beam Technology, "Products and Applications", Roth & Rau AG, 8 pages.

* cited by examiner

*Primary Examiner* — Paul D Kim (57) ABSTRACT

A process for fabricating a magnetic recording transducer for use in a data storage system comprises providing a substrate, an underlayer and a first nonmagnetic intermediate layer deposited to a first thickness on and in contact with the underlayer, performing a first scanning polishing on a first section of the first intermediate layer to planarize the first section of the first intermediate layer to a second thickness, providing a main pole in the planarized first section of the first intermediate layer, providing a first pattern of photoresist on and in contact with the first section of the first intermediate layer, the pattern comprising an aperture to define a side shield trench, performing a wet etch to remove at least a portion of the first intermediate layer thereby exposing at least one of the plurality of main pole sides, and depositing side shield material in the side shield trench.

24 Claims, 7 Drawing Sheets

PROCESS FOR FABRICATING A MAGNETIC POLE AND SHIELDS

BACKGROUND

Figure 1:
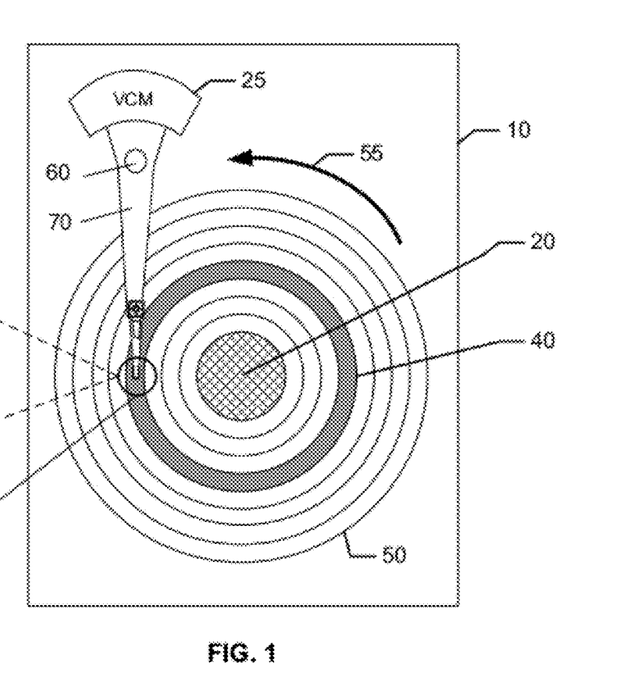
FIG. 1 illustrates a conventional disk drive in a top view.

FIG. 1 illustrates a conventional disk drive 10 used for data storage. Figures are not drawn to scale and only certain structures are depicted for clarity. Disk media 50 is attached to spindle motor and hub 20. The spindle motor and hub 20 rotate the media 50 in a direction shown by arrow 55. Head Stack Assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

Figure 1A:
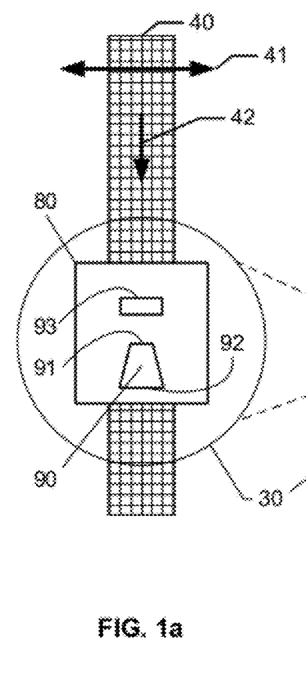
FIG. 1a illustrates a more detailed view of an area shown in FIG. 1.

FIG. 1a illustrates an enlarged view of magnetic recording head 30 of FIG. 1. A magnetic recording transducer 90 may be fabricated on slider 80. Slider 80 may be attached to suspension 75 and suspension 75 may be attached to actuator arm 70 as shown in FIG. 2.

Referring again to FIG. 1a, Slider 80 is illustrated above recording track 40. Media 50 and track 40 are moving under slider 80 in an in-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in direction 42.

Figure 2:
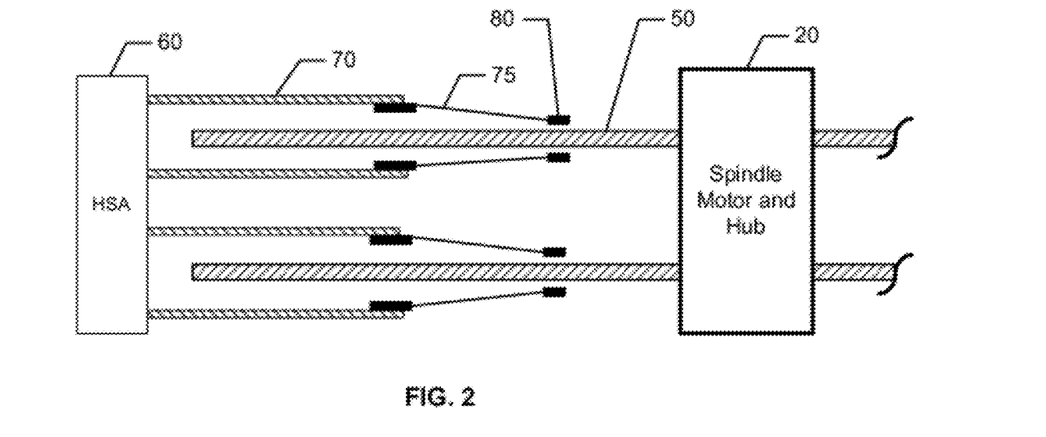
FIG. 2 illustrates a side view of the disk drive shown in FIG. 1.

FIG. 2 illustrates a side view of disk drive 10 shown in FIG. 1. At least one disk media 50 is mounted onto spindle motor and hub 20. HSA 60 comprises at least one actuator arm 70 that carries suspension 75 and slider 80. Slider 80 has an Air Bearing Surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

DETAILED DESCRIPTION OF THE EMBODIMENTS

Figure 3:
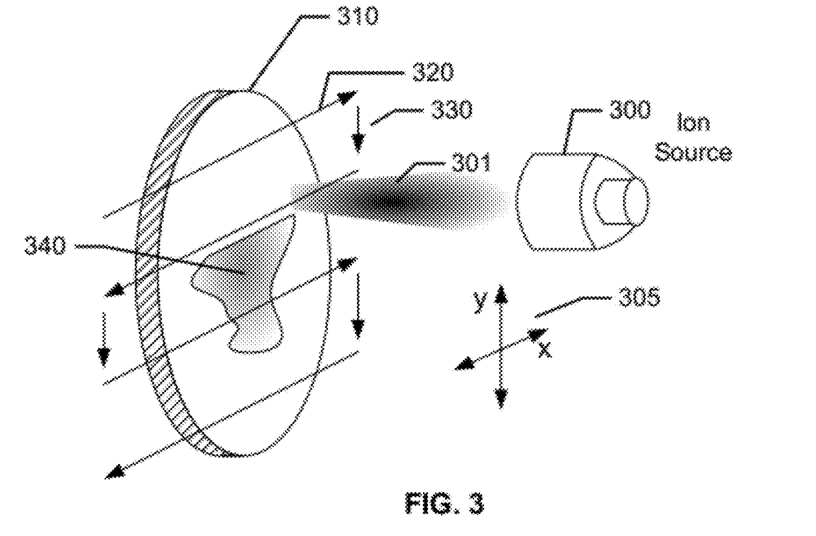
FIG. 3 illustrates a scanning polishing process.

FIG. 3 illustrates a scanning polishing process. A scanning ion source 300 may be operable to move a narrow ion beam 301 over substrate 310. Scanning ion source 300 may move in an X or Y direction shown in axis 305 to move the narrow ion beam 301 over the substrate 310. In one embodiment, narrow ion beam 301 may move across substrate 310 in first direction 320, then down substrate 310 in second direction 330; and then alternating directions until the entire substrate 310 has been milled. Substrate 310 may have surface irregularity 340 that results from imperfect manufacture; for example, chemical mechanical polishing (CMP) dishing or crowning errors. The scanning polishing apparatus operates by scanning a target or receiving topographical information about the target from another means; and making a determination how much material is to be removed to provide improved planarization. In one embodiment the scanning operation may be performed simultaneously with polishing. The amount of material removed from substrate 310 may be controlled by varying the dwell time over the substrate 310 as the scanning ion source 300 is moved in the X or Y directions. A longer dwell time, or slower motion rate, will result in more material being removed by narrow ion beam 301.

Figure 4:
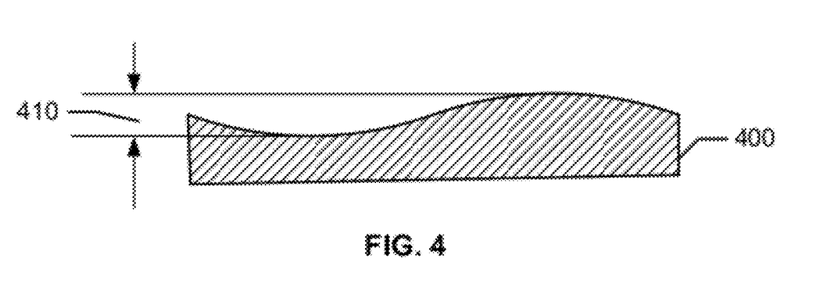
FIG. 4 illustrates a substrate before scanning polishing.

FIG. 4 illustrates substrate 400 before scanning polishing. Substrates in the foregoing descriptions may comprise multiple layers and materials. Substrate 400 has surface irregularity 410. Surface irregularity 410 is shown highly exaggerated and simplified for illustrative purposes. Actual surface irregularity, for example, that caused by CMP, may be complex and inconsistent, or may have regular patterns such as rings or swirls. In one embodiment, substrate 400 may have surface irregularity from approximately 15-200 nanometers (nm).

Figure 5:
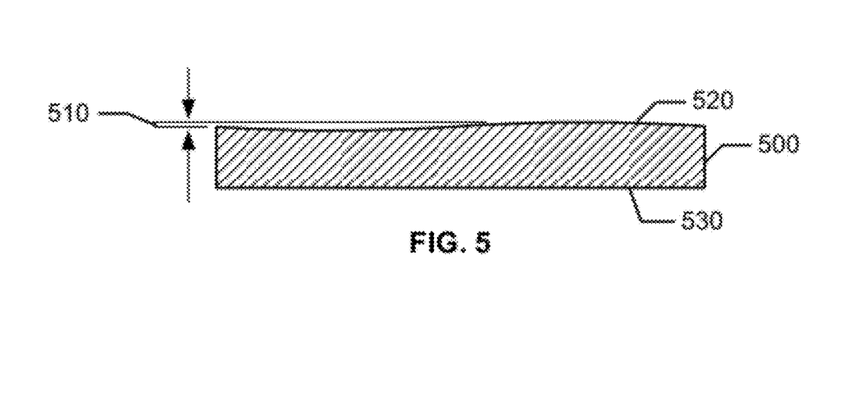
FIG. 5 illustrates a substrate after scanning polishing.

FIG. 5 illustrates substrate 500 after scanning polishing. Substrate 500 has surface irregularity 510 after scanning polishing. Surface irregularity 510 has been reduced by scanning polishing to from approximately 0.1 nm-5 nm.

In one embodiment, surface irregularity 510 may be measured by scanning the variation of top surface 520 from an ideal plane; this method hereinafter called surface referenced scanning. In another embodiment, surface irregularity 510 may be measured by scanning the thickness from top surface 520 to bottom 530 of substrate 500; this method hereinafter called thickness referenced scanning. Thickness referenced scanning may be performed by optical scanning, or by measurement of physical markers such as lapping guides. In some applications it may be desired to use surface referenced scanning polishing for subsequent operations; and in other applications, it may be desired to use thickness referenced scanning to provide a uniform thickness of the substrate, or of another layer on the substrate.

Figure 6:
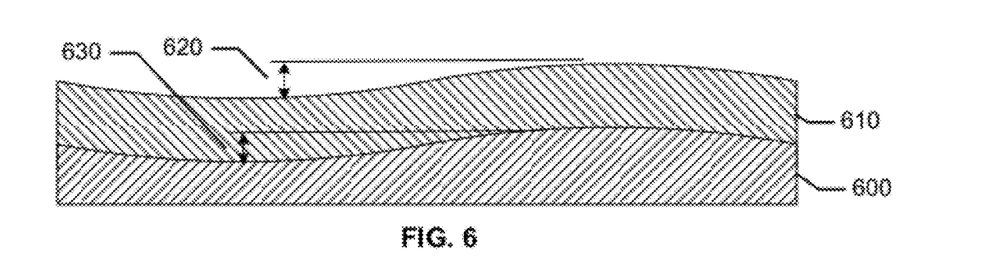
FIG. 6 illustrates an intermediate layer over a substrate before scanning polishing.

FIG. 6 illustrates intermediate layer 610 over substrate 600 prior to scanning polishing. The substrate material 600 may be for example, AlTiC; and the intermediate material may be alumina ($Al_2O_x$), although other materials may be used. Top surface irregularity 620 may conform to substrate surface irregularity 630, or may be non-conformal. Non-conformal thickness in intermediate layer 610 thickness may result from uneven deposition of intermediate layer 610 over substrate 600; for example, due to spin coating, or application of a fluid layer that fills in depressions differently than high areas.

Figure 7:
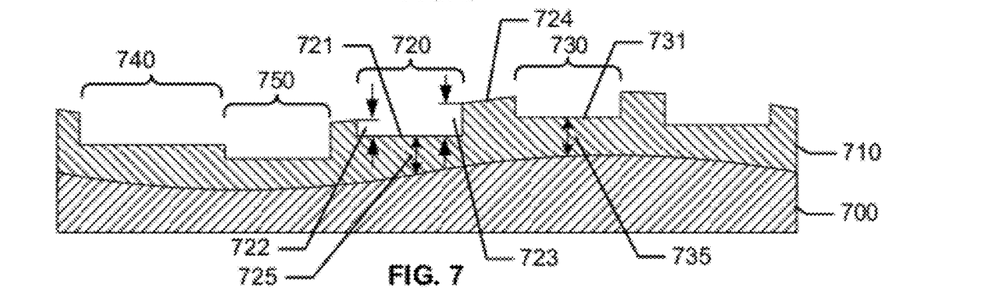
FIG. 7 illustrates an intermediate layer with surface referenced scanning polishing.

FIG. 7 illustrates an intermediate layer 710 after surface referenced scanning polishing. Intermediate layer 710 may be provided on substrate 700. Substrate 700 and/or intermediate layer 710 have undesirable surface irregularity that may affect subsequent operations. Portions of intermediate layer 710 are illustrated as fields leveled by surface referenced scanning polishing. Field 720 in intermediate layer 710 may be substantially flatter than either the original intermediate layer 610 illustrated in FIG. 6 or the underlying substrate 700. Field 720 may be one of multiple such fields, and a substrate may comprise numerous fields. Fields in some embodiments may be directly adjacent to one another, as shown by field 740 adjacent to field 750, or may be separated as shown by unmilled section 724 between field 720 and field 730. Field 720 has been flattened by scanning polishing first height 722 and second height 723 and the area therebetween in amounts needed to produce flat surface 721. The thickness 725 of intermediate layer 720 under field 721 varies; however, surface 721 may be a substantially flat surface. The thickness 735 under surface 731 may also be a different thickness across field 730, and different from the thickness 725 for field 720.

Scanning polishing fields for surface referenced scanning polishing or thickness referenced scanning polishing may be any suitable size. In one embodiment, the field size may be selected to correspond to a photolithographic flash field. In step-and-repeat photolithography, masks may not be a full wafer in size, and a single mask may be used many times to pattern an entire wafer. It is not necessary for the entire substrate to be flattened to a single plane, and may be advantageous to only flatten locally the area needed for a flash field. This may also reduce scanning polishing time. In one embodiment, a field size may be selected according to how much variation exists in an area. In one embodiment, one scanning polishing field may be flattened to accommodate multiple flash fields.

Figure 8:
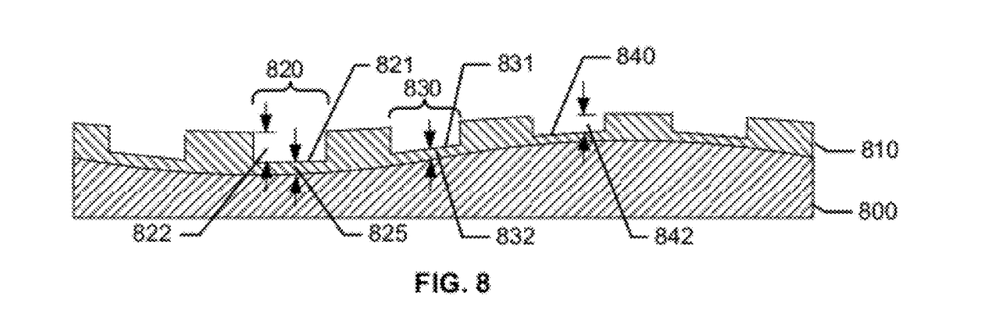
FIG. 8 illustrates an intermediate layer with thickness referenced scanning polishing.

FIG. 8 illustrates an intermediate layer 810 with thickness referenced scanning polishing. Intermediate layer 810 may be provided on substrate 800. Substrate 800 and intermediate layer have undesirable surface irregularity that may affect subsequent operations. In some applications, it may be desirable to have a layer with highly uniform thickness. Portions of intermediate layer 810 are illustrated as leveled by thickness referenced scanning polishing. Field 820 in intermediate layer 810 has been thinned to thickness 825 by removing an amount 822 from the surface of intermediate layer 810. Surface 821 may not be flat but may follow the contour of substrate 800 such that thickness 825 is uniform. Field 820 may be one of multiple such fields, and a substrate may comprise a large number of fields. Field 830 is illustrated with thickness 832 following the contour of underlying intermediate layer 800, and surface 831 in a slightly different plane from surface 821. Surface 840 has been milled by an amount 842 that may be less than amount 822. This may occur if intermediate layer 810 is thicker in field 820, for example due to uneven spin coating.

In one embodiment thickness referenced scanning polishing may be combined with surface referenced scanning polishing to provide improvements in both layer thickness and surface flatness. In one embodiment, surface referenced scanning polishing may be performed first and thickness referenced scanning polishing may be performed second. This embodiment may be advantageous when the intermediate layer thickness variation is large compared to the substrate irregularity. In another embodiment, thickness referenced scanning polishing may be performed first and surface referenced scanning polishing may be performed second. This embodiment may be advantageous when the substrate irregularity is large compared to the intermediate layer irregularity.

Figure 9:
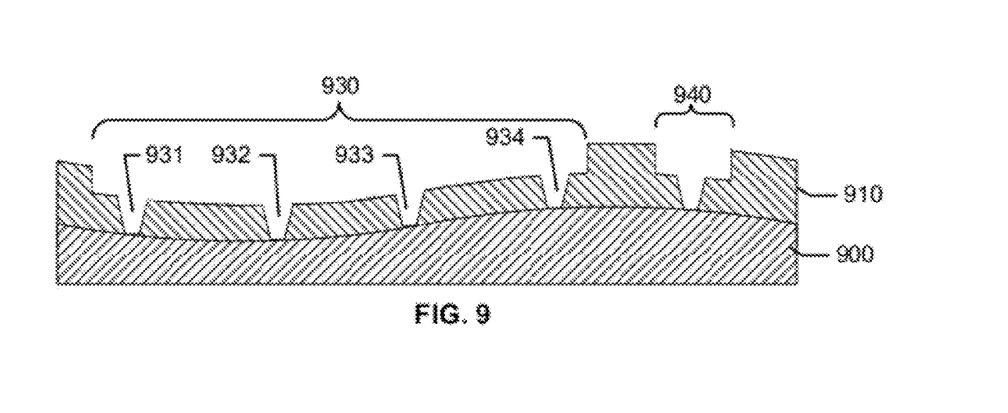
FIG. 9 illustrates trenches in an intermediate layer that has received thickness referenced scanning polishing.

FIG. 9 illustrates trenches in an intermediate layer that has received thickness referenced scanning polishing. Intermediate layer 910 is on substrate 900 and has large field 930 and small field 940. Large field 930 may comprise a single photolithographic flash field or multiple flash fields. Trenches 931-34 are formed in intermediate layer 910 and may extend to substrate 900. In one embodiment, a stop layer may be between substrate 900 and intermediate layer 910. Field 930 has received thickness referenced scanning polishing, so trenches 931-34 have uniform height, even though substrate 900 and intermediate layer 910 are uneven.

FIGS. 10-26 illustrate process 100 to provide a magnetic pole and shields using scanning polishing in one embodiment of the invention. Figures are not to scale and some features are exaggerated for clarity. Steps that are well known in the art may be highly simplified or omitted from the figures.

Figure 10:
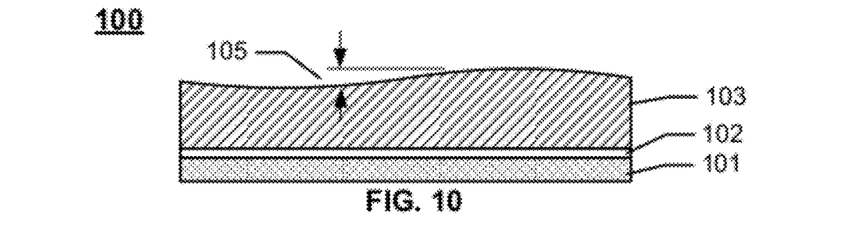
FIGS. 10-26 illustrate a process to provide a magnetic pole and shields using scanning polishing in one embodiment of the invention.

FIG. 10 illustrates substrate 101, underlayer 102, and an intermediate layer 103 on and in contact with underlayer 102. Substrate 101 may comprise a magnetic or nonmagnetic material. Intermediate layer 103 may comprise alumina, and underlayer 103 may comprise an etch stop layer, dielectric layer, a metal layer, or nonmagnetic layer. A bottom anti-reflective layer (BARC) may also be used in place of or on top of underlayer 102 and may be removed in a later process. Intermediate layer 103 has surface irregularity 105. Surface irregularity 105 may be a result of CMP error, uneven deposition of intermediate layer 103, uneven underlayer 102, or uneven substrate 101. In one embodiment irregularity 105 may be greater than 15 nm.

Figure 11:
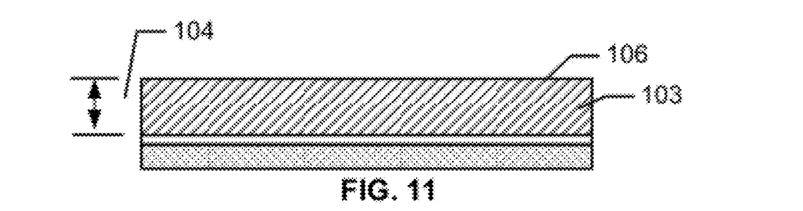

FIG. 11 illustrates intermediate layer 103 after scanning polishing. In one embodiment, intermediate layer 103 thickness has been milled to thickness 104 with a tolerance from approximately 0.1 nm to 1.5 nm using thickness referenced scanning polishing. In one embodiment, surface 106 of intermediate layer 103 has been milled to flat within 0.1 nm to 1.5 nm variations using surface referenced scanning polishing.

Figure 12:
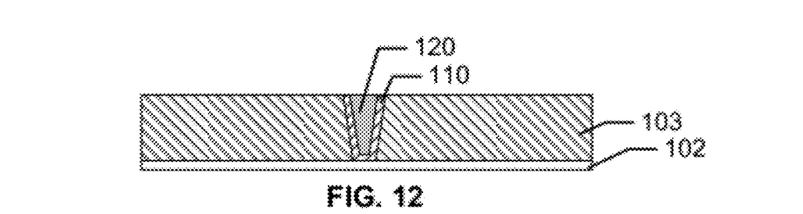

FIG. 12 illustrates underlayer 102, intermediate layer 103; and pole 120 deposited in liner 110 in intermediate layer 103. In one embodiment, liner 110 may comprise ruthenium (Ru) and pole 120 may comprise alloys of cobalt, nickel, and iron, for example, CoNiFe or CoFe. Methods of forming a pole in a trench are known, and any suitable method may be used without departing from the scope of the invention. Further, a plurality of trenches and a plurality of main poles can be formed in the intermediate layer 103. Since the thickness of intermediate layer 103 was closely controlled as described in FIG. 11, pole 120 height may also be very closely controlled.

Pole 120 may be fabricated in intermediate layer 103 by forming a hard mask on intermediate layer 103. The hard mask may comprise tantalum or ruthenium. A pole trench is etched into intermediate layer 103 and etching the pole trench may be by using reactive ion etching. Magnetic material may be plated in the main pole trench, and CMP performed to remove magnetic material above the hard mask, and removing the hard mask may be by reactive ion etching.

Figure 13:
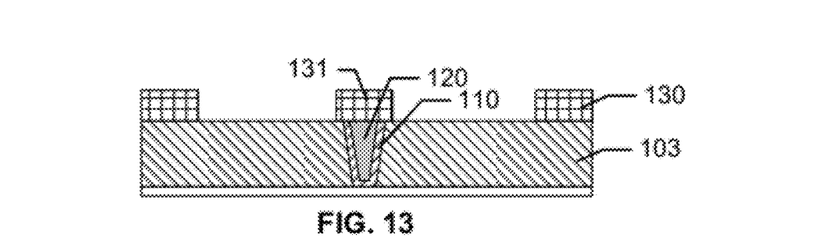

FIG. 13 illustrates photo mask 130 and photo mask 131 provided on and in contact with intermediate layer 103 to pattern an aperture for etching a trench. Photo mask 131 covers pole 120 and liner 110 to prevent damage to pole 120 during etching, and photo mask 130 defines the location of the outer extent of the trench. Photo mask material may comprise any suitable photoresist.

Figure 14:
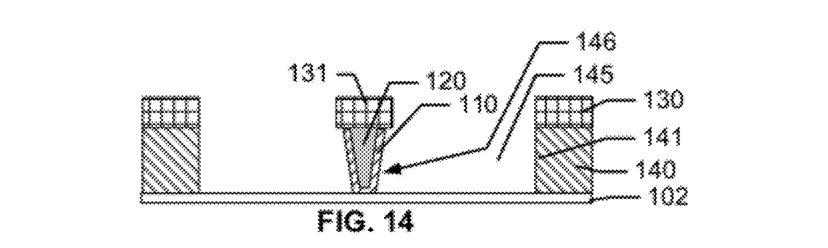

FIG. 14 illustrates trench 145 after wet etching. Intermediate material 103 has been removed from side 146 of liner 110. Wet etching also forms side wall 141 on intermediate material 140 and exposes underlayer 102. Photo mask 130 and photo mask 131 may be removed after trench 146 has been etched.

Figure 15:
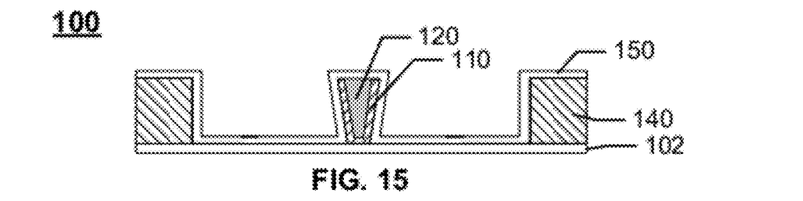

FIG. 15 illustrates seed layer 150 deposited over the entire field comprising intermediate layer 140, underlayer 102, liner 110, and pole 120. In one embodiment, seed layer 150 may comprise NiFe.

Figure 16:
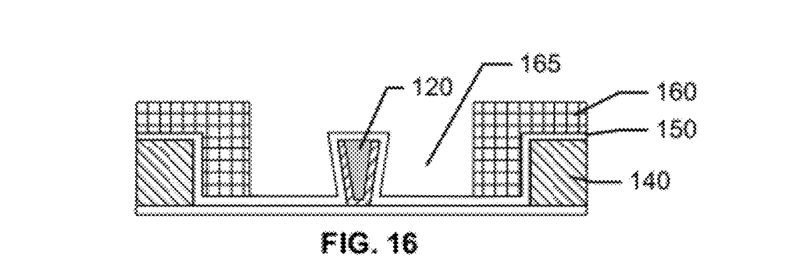

FIG. 16 illustrates photo mask 160 applied over seed layer 150 to provide a side shield trench 165 between pole 120 and intermediate layer 140. Photo mask 140 defines an outer dimension of the side shield trench 165. Although illustrated as a vertical outer wall in photo mask 140, trench walls may be beveled, curved, canted, tilted or have other geometric shapes.

Figure 17:
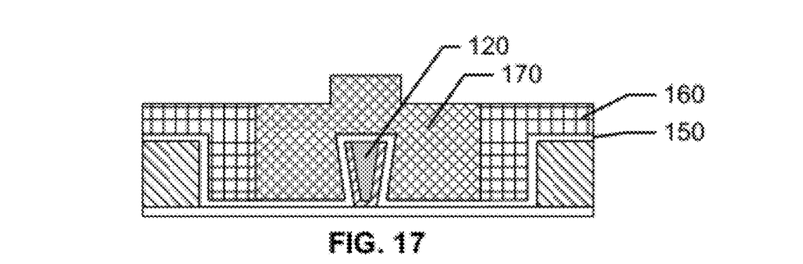

FIG. 17 illustrates plating side shield 170 on seed layer 150 where not covered by photo mask 160. Side shield 170 may also cover the top of pole 120, removed in a later operation. In one embodiment, side shield 170 may comprise NiFe. In other embodiments, side shield 170 may comprise layers of material, and may incorporate magnetic coupling layers. In one embodiment, side shield 170 may be physically or magnetically coupled to an underlayer, for example, a bottom shield.

Figure 18:
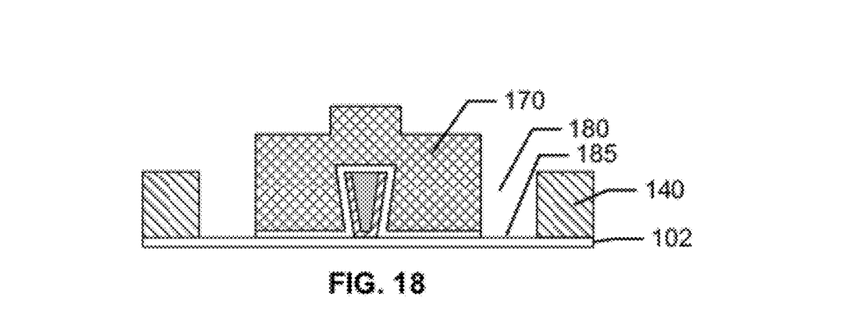

FIG. 18 illustrates side shield 170, intermediate layer 140, and trench 180. Seed layer 150 has been removed from trench bottom 185, thereby exposing underlayer 102. In one embodiment, seed layer 150 may be removed by ion milling.

Figure 19:
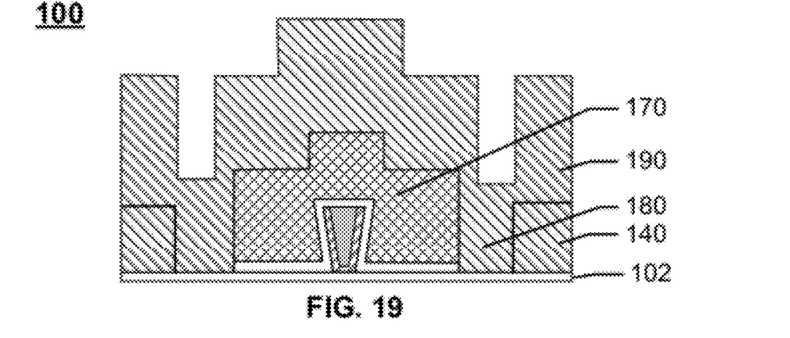

FIG. 19 illustrates side shield 170, interlayer 102, intermediate material 140 and trench 180. Trench 180 is filled with intermediate material 190. Intermediate material 190 may overfill intermediate material 140, and Intermediate material 190 and intermediate material 140 may be the same material.

Figure 20:
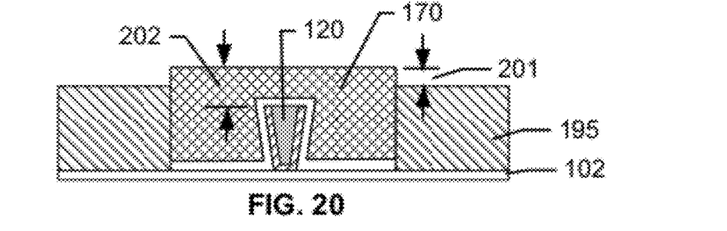

FIG. 20 illustrates first CMP to expose side shield material 170 and provide rough planarization on the top of side shield 170. CMP may be stopped a first distance 202 above the top of pole 120. Due to the uneven CMP rates of different materials, intermediate material 195 may be over polished a distance 201 more than first distance 202. In one embodiment first distance 202 may be from approximately 0.1 um to 0.2 um.

Figure 21:
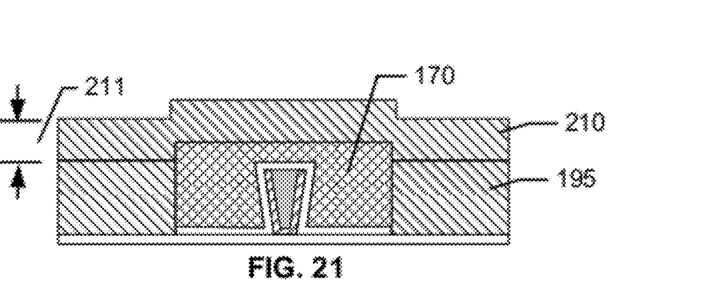

FIG. 21 illustrates refilling intermediate material 210 over side shield 170 and over intermediate material 195 to correct CMP over polishing 201 illustrated in FIG. 20. Intermediate material 210 and intermediate material 195 may be the same material. In one embodiment intermediate material thickness 210 may be from approximately 0.1 um to 0.5 um.

Figure 22:
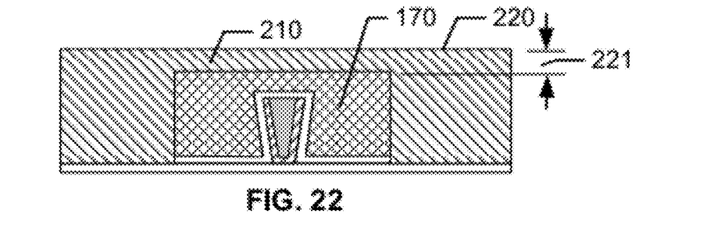

FIG. 22 illustrates a second CMP process to planarize intermediate material 210 surface 220 to a first thickness 221 above side shield 170. First thickness 221 may be chosen to provide margin for subsequent operations and without risk of exposing side shield 170. In one embodiment first thickness 221 may be at least 0.2 um.

Figure 23:
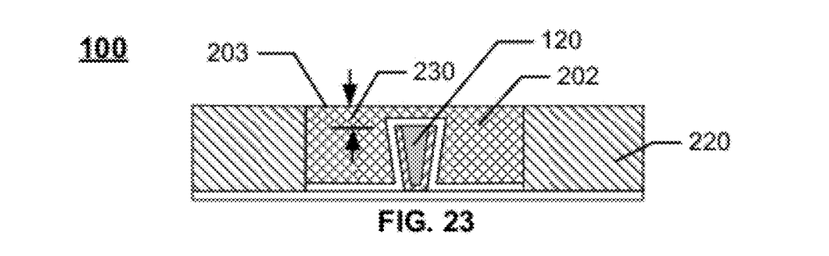

FIG. 23 illustrates a second scanning polishing operation to reduce the variation resulting from the second CMP operation described in FIG. 22. To prevent CMP damage to pole 120 due to over polishing in an attempt to remove side shield material 202 on top of pole 120, side shield material 202 CMP was intentionally stopped prior to exposing the pole 120 to ensure the pole is not exposed or have excessively thin material over the pole; possibly due to polishing error and variation across the wafer. A second scanning polishing operation may be performed to mill surface 203 of side shield material 202 and intermediate material 220 to thickness 230 above pole 120. In one embodiment, surface referenced scanning polishing may be used, and the surface referenced scanning polishing may be within a field as described in FIG. 7 and accompanying descriptions. In one embodiment the surface referenced scanning polishing may remove material to thickness 230 above pole 120 to less than 0.25 um. In another embodiment, the surface referenced scanning polishing remove material thickness 230 above pole 120 to less than 0.1 um.

In one embodiment, thickness referenced scanning polishing may be used, and the thickness referenced scanning polishing may be within a field as described in FIG. 8 and accompanying descriptions. In one embodiment the thickness referenced scanning polishing may remove material to thickness 230 above pole 120 to less than 0.25 um. In another embodiment, the thickness referenced scanning polishing remove material to thickness 230 above pole 120 to less than 0.1 um.

Figure 24:
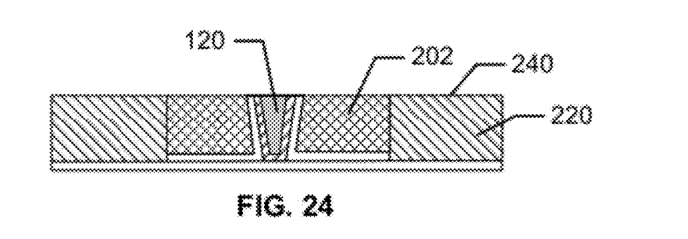

FIG. 24 illustrates removal of remaining side shield material 202 from the top of pole 120 using ion beam milling. The ion beam milling may employ stop milling by use of lapping guides, optical inspection, or time-based milling. Since the material to be removed may be very thin, very precise control of milling stop can be achieved. The methods described in the preceding operations are highly advantageous because they expose the pole top without the use of hard masks; as removal of hard masks can be difficult and may result in damage to the pole.

Figure 25:
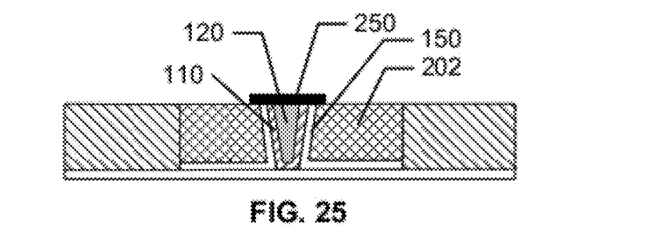

FIG. 25 illustrates the deposition of write gap 250 on the top of pole 120 and liner 110; and may also extend over seed 150 and side shield 202. In one embodiment, write gap 250 may comprise Ru; and in one embodiment, write gap 250 may comprise an atomic layer deposition of nonmagnetic material.

Figure 26:
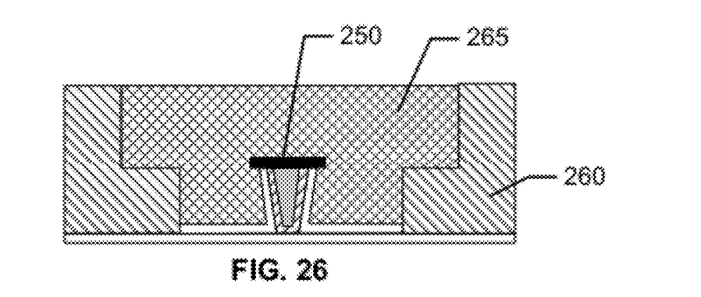

FIG. 26 illustrates deposition of shield 265 over write gap 250 and intermediate material 260. Shield material 265 may be the same material as side shield material 202 in previous figures, or may comprise a different shield material. The process used to deposit shield 265 and refill intermediate material 260 may follow the same processes as previously described.

Although the foregoing has been described in terms of certain embodiments, other embodiments will be apparent to those of ordinary skill in the art from the disclosure herein. Figures are illustrative and not drawn to scale. For example, shields and poles shown as solids may employ gradients, or have ferromagnetic or antiferromagnetic coupling layers. Seed layers, BARC layers, photolithographic masking, residue removal, and plating details are well known in the art, and would be apparent to those of skill in the art. Common features that are known to those of ordinary skill in the art have been omitted or simplified in figures for clarity. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

We claim:

1. A process for fabricating a magnetic recording transducer having a main pole including a pole top, a plurality of sides, and a shield adjacent to at least one of the plurality of sides for use in a data storage system, comprising:
   providing a substrate, an underlayer and a first nonmagnetic intermediate layer deposited to a first thickness on and in contact with the underlayer;
   performing a first scanning polishing on a first section of the first intermediate layer to planarize the first section of the first intermediate layer to a second thickness;
   providing a plurality of trenches in the first section of the first intermediate layer; providing a plurality of main poles in the plurality of trenches in the planarized first section of the first intermediate layer;
   providing a first pattern of photoresist on and in contact with the first section of the first intermediate layer, the pattern comprising an aperture to define a side shield trench;
   performing a wet etch to remove at least a portion of the first intermediate layer thereby exposing at least one of the plurality of main pole sides; and
   depositing side shield material in the side shield trench.

2. The process of claim 1 wherein the first section of the first intermediate layer comprises at least one photolithographic flash field.

3. The process of claim 1 wherein the first scanning polishing is performed with an ion beam.

4. The process in claim 1 wherein the first intermediate layer comprises aluminum oxide.

5. The process of claim 1 wherein the second thickness is planar within less than approximately 1.5 nanometers within the first section of the first intermediate layer.

6. The process of claim 1 wherein the underlayer comprises at least one of:
a reactive ion etch stopping layer;
a wet etch stopping layer;
a magnetic coupling layer; and
a non-magnetic dielectric layer.

7. The process of claim 1 wherein providing the main pole in the first intermediate layer further comprises:
forming a hard mask on the first intermediate layer;
etching a main pole trench in the first intermediate layer;
plating magnetic material in the main pole trench;
performing a second CMP to remove magnetic material above the hard mask; and
removing the hard mask.

8. The process of claim 7 wherein the hard mask comprises tantalum or ruthenium.

9. The process of claim 7 wherein etching the pole trench includes using reactive ion etching.

10. The process of claim 7 wherein the plated magnetic material comprises CoNiFe or CoFe.

11. The process of claim 7 wherein removing the hard mask comprises reactive ion etching.

12. A process for fabricating a magnetic recording transducer having a main pole including a pole top, a plurality of sides, and a shield adjacent to at least one of the plurality of sides for use in a data storage system, comprising:
providing a substrate, an underlayer and a first nonmagnetic intermediate layer deposited to a first thickness on and in contact with the underlayer;
performing a first scanning polishing on a first section of the first intermediate layer to planarize the first section of the first intermediate layer to a second thickness;
providing the main pole in the planarized first section of the first intermediate layer;
providing a first pattern of photoresist on and in contact with the first section of the first intermediate layer, the pattern comprising an aperture to define a side shield trench;
etching a side shield trench in the aperture and filling the side shield trench with shield material;
providing a second intermediate layer over at least a portion of the first section of the first intermediate layer;
performing a chemical mechanical polishing (CMP) to reduce the thickness of the second intermediate layer to less than a first height above the pole top;
performing a second scanning polishing on the second intermediate layer to less than a second height above the pole top;
performing ion milling to expose the pole top;
providing a write gap layer on the top of the main pole; and
providing a top shield, at least a portion of the top shield on the write gap layer.

13. The process of claim 12 wherein providing the main pole in the first intermediate layer further comprises:
forming a hard mask on the first intermediate layer;
etching a main pole trench in the first intermediate layer;
plating magnetic material in the main pole trench;
performing a chemical mechanical polishing to remove magnetic material above the hard mask; and
removing the hard mask.

14. The process of claim 12 wherein the shield material comprises NiFe.

15. The process of claim 12 wherein at least one of the first intermediate layer or second intermediate layer comprises aluminum oxide.

16. The process of claim 15 wherein depositing the side shield material further comprises:
providing a plating seed layer;
providing a second mask pattern distal from the main pole to define an outer edge corresponding to at least one side shield;
plating a side shield;
removing the second mask pattern thereby forming a shield gap at the outer edge; and
filling the shield gap with a third intermediate layer.

17. The process of claim 16 wherein the third intermediate layer comprises aluminum oxide.

18. The process of claim 12 wherein etching a side shield trench in the aperture and filling the side shield trench with shield material further comprises:
performing a wet etch to remove at least a portion of the first intermediate layer thereby exposing at least one of the plurality of main pole sides; and
depositing shield material in the side shield trench.

19. A process for fabricating a magnetic recording transducer having a main pole including a pole top, a plurality of sides, and a shield adjacent to at least one of the plurality of sides for use in a data storage system, comprising:
providing a substrate, an underlayer and a first nonmagnetic intermediate layer deposited to a first thickness on and in contact with the underlayer;
performing a first scanning polishing on a first section of the first intermediate layer to planarize the first section of the first intermediate layer to a second thickness;
providing the main pole in the planarized first section of the first intermediate layer;
providing a first pattern of photoresist on and in contact with the first section of the first intermediate layer, the pattern comprising an aperture to define a side shield trench; and
performing a wet etch to remove at least a portion of the first intermediate layer thereby exposing at least one of the plurality of main pole sides, and depositing side shield material in the side shield trench, wherein the performing the first scanning polishing includes surface referenced scanning.

20. The process of claim 19, where the surface reference scanning includes scanning for variation of the first section of the first intermediate layer as compared to an ideal plane.

21. A process for fabricating a magnetic recording transducer having a main pole including a pole top, a plurality of sides, and a shield adjacent to at least one of the plurality of sides for use in a data storage system, comprising:
providing a substrate, an underlayer and a first nonmagnetic intermediate layer deposited to a first thickness on and in contact with the underlayer;
performing a first scanning polishing on a first section of the first intermediate layer to planarize the first section of the first intermediate layer to a second thickness;
providing the main pole in the planarized first section of the first intermediate layer;

providing a first pattern of photoresist on and in contact with the first section of the first intermediate layer, the pattern comprising an aperture to define a side shield trench; and performing a wet etch to remove at least a portion of the first intermediate layer thereby exposing at least one of the plurality of main pole sides, and depositing side shield material in the side shield trench, wherein the performing the first scanning polishing includes thickness reference scanning.

22. The process of claim 21, wherein the thickness reference scanning includes scanning the first thickness from a top surface of the first section of the first intermediate layer to a bottom surface of the substrate.

23. The process of claim 22, wherein the thickness reference scanning is performed by optical scanning.

24. The process of claim 23, wherein the thickness reference scanning is done by measurement of a plurality of lapping guides.

* * * * *